March 19, 1935.  W. J. BELCHER  1,995,112
CHAIN
Filed July 15, 1932  4 Sheets-Sheet 2

INVENTOR
Warren J. Belcher
BY
Gifford, Scull & Burgess
ATTORNEYS.

March 19, 1935. W. J. BELCHER 1,995,112
CHAIN
Filed July 15, 1932 4 Sheets-Sheet 3
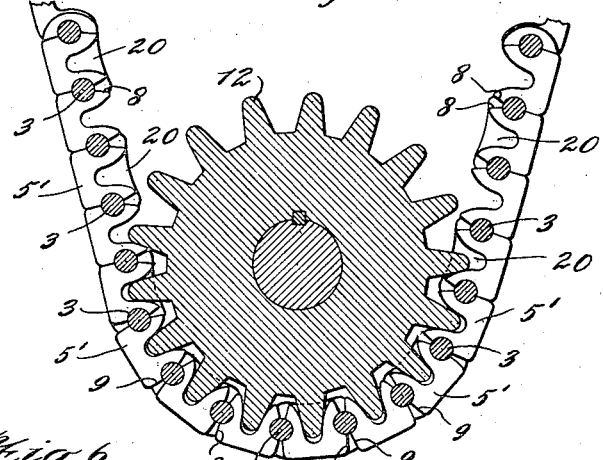
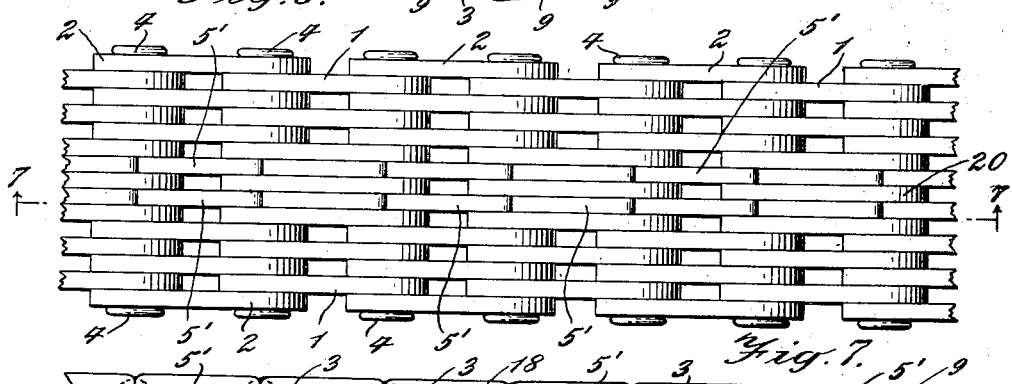
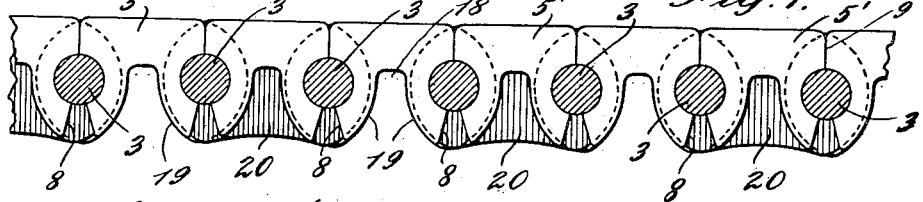
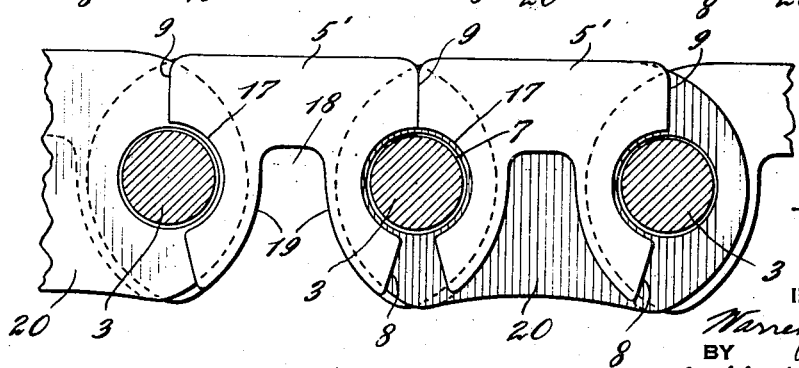
INVENTOR
Warren J. Belcher
BY
Gifford, Scull & Burgess
ATTORNEYS March 19, 1935. W. J. BELCHER 1,995,112
CHAIN
Filed July 15, 1932 4 Sheets-Sheet 4
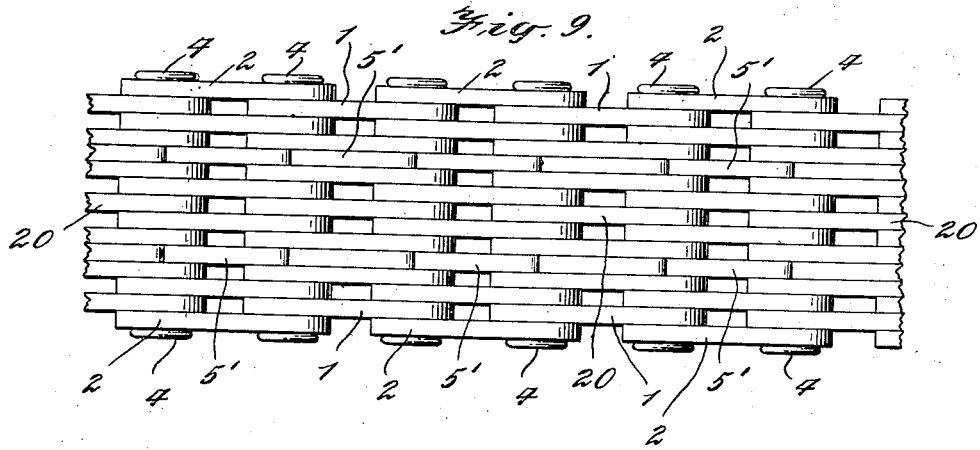
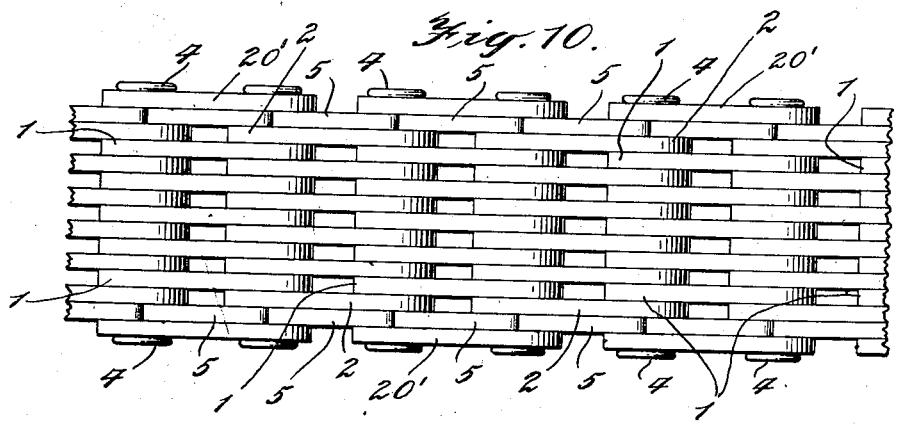
INVENTOR
Warren J. Belcher
BY
Gifford, Scull & Burgess
ATTORNEYS.

Patented Mar. 19, 1935

1,995,112

UNITED STATES PATENT OFFICE 1,995,112

CHAIN

Warren J. Belcher, West Hartford, Conn., assignor to the Whitney Mfg. Co., Hartford, Conn., a corporation of Connecticut Application July 15, 1932, Serial No. 622,637

20 Claims. (Cl. 74—245)

This invention relates to a chain and more particularly to means for preventing so-called "back-bending" thereof. When a chain is elongated between sprockets or other driving and driven elements, an initial bend is deliberately introduced into the chain, this bend being towards the back of the chain or away from the sprockets and being just sufficient so that, as the chain becomes run in and the parts become adjusted to each other, the chain will be substantially straight. As wear continues, however, it often happens that the chain will sag towards the front of the chain or towards the sprockets, and a vibration will occur in the chain which makes an undesirable noise and also increases the wear on the different parts. The vibration may be avoided at least to a very large extent by providing means for preventing this sagging of the chain, and it is to the provision of such means that this application relates.

In the accompanying drawings, I have shown a selected embodiment of the invention, and in those drawings:

Fig. 5 is a view corresponding to part of Fig. 1, but showing another form of member for preventing back-bending of chain.

Fig. 6 is a back view of a portion of the chain appearing in Fig. 5.

Fig. 7 is a view on the line 7—7 of Fig. 6.

Fig. 8 is a view on the same plane as Fig. 7 but on an enlarged scale so as to show the relations of the different parts as in Fig. 4.

Figs. 9 and 10 are views corresponding to Fig. 6, but showing different locations of the members for preventing back-bending of the chain.

Figure 1:
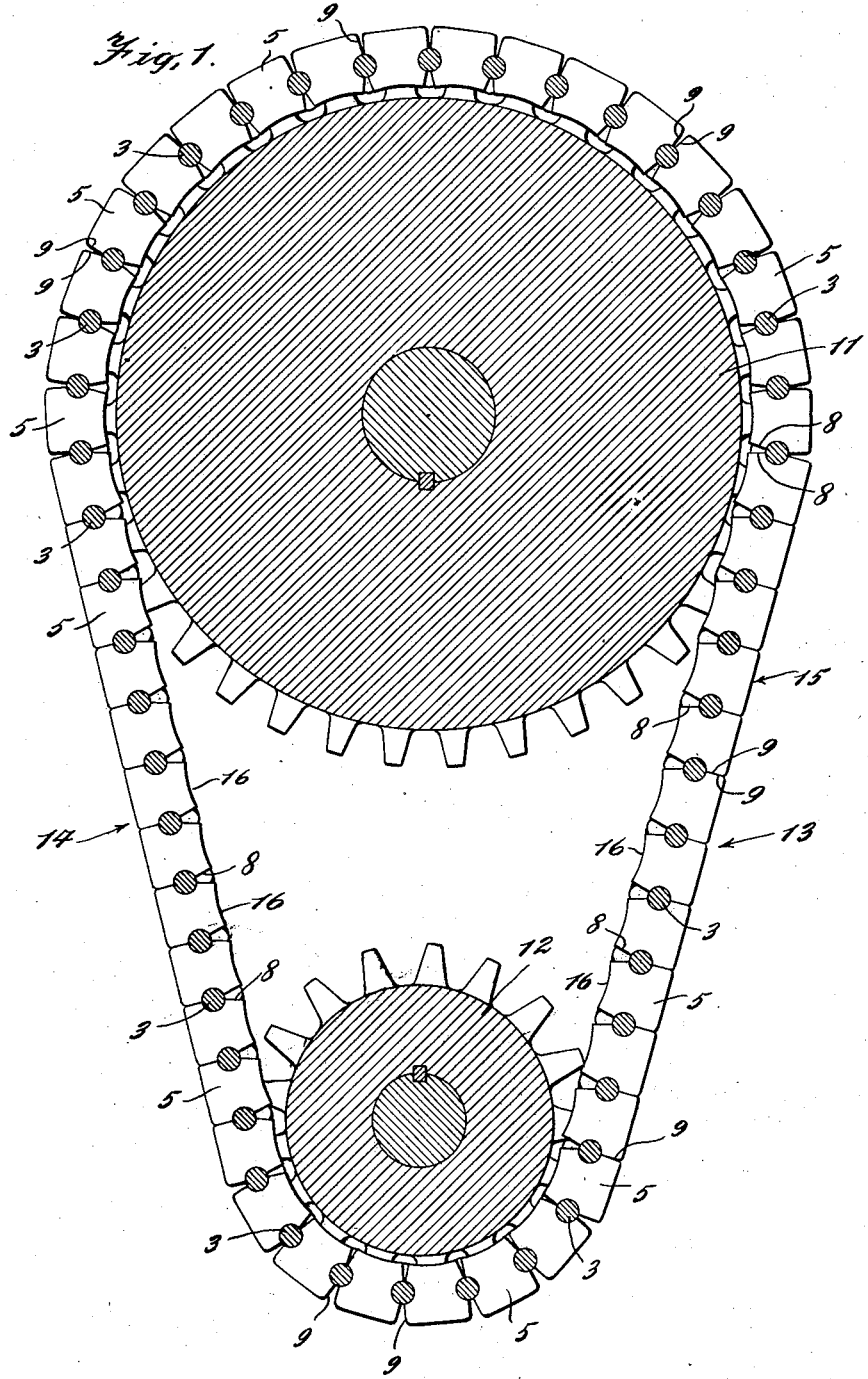
Fig. 1 is a sectional view through a chain and sprockets over which the chain is placed, and showing one form of member for preventing back-bending of the chain.
Figure 2:
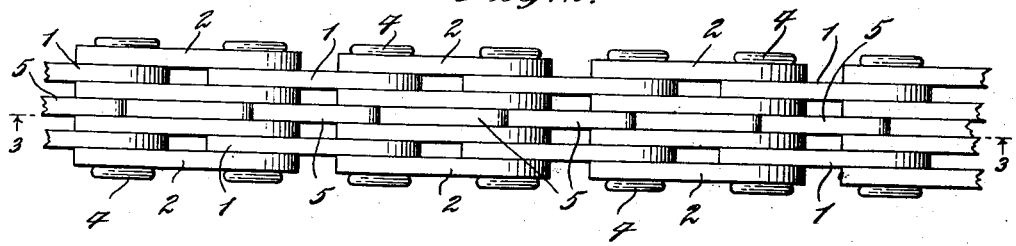
Fig. 2 is a back view of a portion of the chain appearing in Fig. 1.
Figure 3:
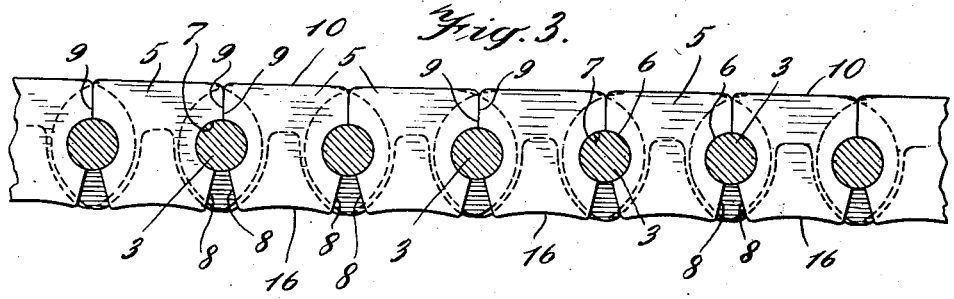
Fig. 3 is a section on the line 3—3 of Fig. 2.

The chain shown is of the so-called "silent" type which has been selected for the purposes of illustration, although it is to be understood that the invention may be used with other types, such, for example, as the well-known roller chain. The chain selected for illustration comprises links connected together by pins, in this instance the links 1 being arranged in what is usually called a pitch, and the links 2 being arranged in a second pitch, the links in these two adjoining pitches overlapping each other and being fastened together by a pin 3 passing through alined holes in the overlapping links and headed as shown at 4 to prevent separation of the links. In this connection, I shall use the term "pin" as defining any member or members adapted to thus hinge together two adjoining pitches of links or two adjoining links, it being understood that I do not intend thereby to limit myself to a single pin, as, for example, a bushing may be used surrounding the pin or any other suitable hinge construction may be employed.

Extending lengthwise of the chain is a row of members 5, these members being shown as disposed end to end in the row and as being disposed between pins. This row of members may be placed wherever desired, as the individual members in the row cooperate with adjoining members without in any way interfering with the operation of the chain. That is to say, the links and pins perform their usual functions as a chain with absolute independence of the action of the members, as will be more fully apparent from the following description.

In Figs. 1, 2, 3, and 4, I have shown the members 5 as disposed end to end in a row along the center of the chain, and, when so located, the members may conveniently be used to form guides to take the place of the usual guide plates adapted to be received in a groove formed in the sprocket teeth which the chain is adapted to engage.

The opposite ends of each member are provided with cylindrical recesses 6, the walls of which are adapted to receive the cylindrical surfaces 7 of the pins. In front of the pins or, in other words, on the side of the pins next the sprocket, the members are provided with surfaces 8, the surfaces on two adjoining members receding from each other, as is plainly shown in the drawings. On the back of the pins, the members are provided with abutments 9 which, when the chain is straight, are in contact with each other, and thus it will be seen that the contacting of these abutments prevents back-bending of the chain. These abutments are preferably disposed on surfaces which are substantially radial with respect to the pins adjacent thereto, and the same may be true of the surfaces 8. The abutments 9 are also preferably normal to a plane passing through the axes of the pins when the chain is straight, and thus the back edge 10 of each member is substantially equal to the center to center spacing of the pins. In any case, the average length of the back edge 10 will be substantially equal to this center to center spacing or pitch of the chain.

The members may also be arranged as side guides to engage the ends of the sprocket teeth, as is well known in the art, thus serving the double purpose of guides and preventing back-bending, my invention being directed to the prevention of back-bending in particular. Such an arrangement is shown in Fig. 10, wherein the members 5 are shown as being located adjacent the edges of the chain for the above purpose.

Referring now particularly to Fig. 1, I have shown a chain of the type just described engaging the teeth on two sprockets 11 and 12, one of which may be a driving sprocket and the other a driven one, for example on a timing mechanism on an automobile. In such a situation, accuracy is essential and it is also highly desirable to prevent back-bending which not only would increase wear of the chain and sprockets, but would also develop objectional noise in operation. It will be seen that the straight stretches 13 and 14 of the chain cannot bend backwardly because of the engagement of the abutments 9 with each other, whereas the receding surfaces 8 permit forward bending of the chain to pass around a sprocket. These surfaces 8 are flared away from each other in a direction away from the pins sufficiently to permit the chain to pass over any desired sprocket. Because of the fact that the abutments 9 are located adjacent the pins and extend radially thereto, it will be seen that the members merely rock upon the pins and do not extend beyond the pins and beyond the back surface 15 of the chain, this surface being defined by the back edges 10 of the members and the back edges of the links with which the members are associated. This feature is of substantial importance, particularly when using the chains in situations where the clearance is small. The front edge 16 of each member is, of course, so designed as to fit within the guide groove of a sprocket when the member is used as a guide, as in the illustrated arrangement.

An important feature of the invention is that the chain may elongate to a considerable extent without affecting the action of the abutments 9 in preventing back-bending. In prior art constructions, one drawback has been that elongation of the chain would disturb the relation between the different parts intended to prevent back-bending so that some compensating arrangement had to be devised. According to my invention, however, elongation of the chain may take place independently of the relation of the means for preventing back-bending, and this feature will be best understood from a study of Fig. 4 in which, as noted above, the relations of the various parts are shown exaggerated.

Figure 4:
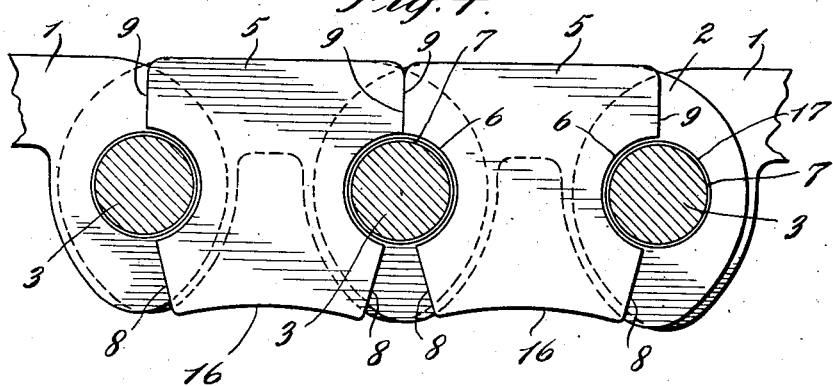
Fig. 4 is a view on the same plane as Fig. 3 but on an enlarged scale and showing the relations of certain parts greatly exaggerated.

Referring to Fig. 4, it will be seen that the links, for example the links 2, have holes, the walls of which are designated 17, these holes receiving the pins 3. In practice, each wall 17 is much closer to the surface 7 of the pin than is shown in Fig. 4, so that there is substantially no play possible between these parts in a direction lengthwise of the chain. As wear takes place, however, between the surfaces 7 and 17, the chain will, of course, elongate. In prior art devices intended to prevent back-bending of chains, plates have been provided in which the pins pass through holes in the plates and so the plates themselves must move lengthwise of the chain as the chain elongates. According to this invention, however, the wall of each recess 6, while cylindrical in shape and concentric with the adjoining pin 3, is spaced therefrom a distance substantially greater than the distance between the pin and the wall 17 of the link hole. That is to say, there is as close a fit as it is possible to get between the pin and the link, whereas there is a loose connection between the pin and the member. The members are designed as described above so that, when the chain is straight, the abutments 9 will be in contact and then the chain may elongate a distance corresponding to the loose connections between the pins and members before the walls of the recesses 6 will be subjected to any wear whatsoever. Then, of course, these walls will stand substantial wear before the abutments will be caused to separate. As a matter of fact, by this time the chain will in all probability be worn sufficiently to be replaced so that for practical purposes the members prevent back-bending of the chain throughout its normal life.

Referring now to Figs. 5, 6, 7, 8, and 9, I have shown a different form of member 5' which is provided with a recess 18 having walls 19 which are adapted to engage the teeth of the sprocket, as shown in Fig. 5. This kind of member straddles the teeth in much the same manner as do the links 1 and 2, but with this important difference, that there is no driving force transmitted through the members 5'. From Fig. 5 it will be seen that the abutments 9 of the members 5' are out of engagement when the chain is passing around a sprocket, and, under normal conditions, the receding surfaces 8 will also be out of contact. Moreover, because of the play between the surfaces 7 and 17, no force will be transmitted from the members to the pins. As shown in Fig. 8, the pins, links, and members have the same relation to each other as in the form shown in Fig. 4. Similar parts have been given the same numerals, and a detailed repetition of the description will not be given. In this connection it may be noted, however, that what has been said above about the members not acting in any way as driving means from or to the sprocket applies with equal force to the form of member shown in Fig. 4.

In Figs. 5, 6, 7, 8, and 9, the chain is shown as having the usual center guide plates 20.

In Fig. 6, the members 5' are shown as being located immediately adjacent the guide plates 20, although because of their form, they may be placed anywhere desired in the width of the chain. For example, in Fig. 9 is shown a construction in which there is also used the usual center guide plates 20, and the members 5' are disposed intermediate the center and the edge of the chain, while in Fig. 10 side plates 20' may be used, and the members 5 may be placed just inside those plates and used as guides. Or, if desired, the plates 20' may serve as guides, and the members 5 may be replaced with members 5'.

It will thus be seen that the arrangement is an extremely flexible one, making it possible to place the members wherever desired in the chain and even to use them for the additional function of a guide if desired.

Aside from the above advantages, there are others which will suggest themselves to those skilled in the art, and one or two of which will be briefly mentioned. For example, the fact that the openings between members occur at the pins rather than between the pins, as in prior art constructions, makes a relatively small opening between the members and consequently there is less of a blow when the abutments come together. Another advantage which may be mentioned is the fact that the members can be easily assembled with the other links in any given pitch, and this is true regardless of whether or not the pitch is a so-called "even" or "odd" pitch. The members may also be used where it is necessary to join the ends of a chain by what is usually called an "offset." In other words, the construction is one which adapts itself very easily to practical construction and operation.

While I have shown the invention as embodied in a certain selected form, nevertheless it is to be understood that various changes in details may be made without departing from the scope of the invention, and I therefore do not intend to limit myself except by the appended claims.

I claim:

1. In a chain having links connected together by pins extending through alined holes in adjacent links, a row of members extending longitudinally of the chain, with the members disposed end to end in said row, abutments on the ends of adjoining members in contact when the chain is straight, and means whereby said abutments remain in contact in the straight chain independently of elongation of the chain.

2. In a chain having links connected together by pins extending through alined holes in adjacent links, a row of members extending longitudinally of the chain, with the members disposed end to end in said row, abutments on the ends of adjoining members in contact when the chain is straight, and a loose connection between said pins and members preventing displacement of the members transversely of the pins forwardly and backwardly but permitting relative movement between the pins and members longitudinally of the chain.

3. In a chain having links connected together by pins extending through alined holes in adjacent links, a row of members each substantially one pitch in length extending longitudinally of the chain, with the members disposed end to end in said row, and abutments on the ends of adjoining members in contact when the chain is straight, said ends being disposed adjacent said pins.

4. In a chain having links connected together by pins extending through alined holes in adjacent links, a row of members independent of the links and extending longitudinally of the chain, with the members disposed end to end in said row, and abutments on the ends of adjoining members in contact when the chain is straight, said ends being disposed adjacent said pins and said abutments extending substantially radially thereof.

5. In a chain having links connected together by pins extending through alined holes in adjacent links, a row of members independent of the links and extending longitudinally of the chain, and abutments on adjoining members extending transversely of the pins on the back side thereof and adjacent thereto.

6. In a chain having links connected together by pins extending through alined holes in adjacent links, a row of members independent of the links and extending longitudinally of the chain, and abutments on adjoining members extending transversely of the pins on the back side thereof and adjacent thereto and substantially radially thereof.

7. In a chain having links connected together by pins extending through alined holes in adjacent links, a row of members extending longitudinally of the chain, with each member disposed between two adjoining pins, and means on said members preventing back-bending of the chain, the opposite end edges of each member having open recesses in which the adjoining pins are disposed.

8. In a chain having links connected together by pins extending through alined holes in adjacent links, a row of members extending longitudinally of the chain, with each member disposed between two adjoining pins, and means on said members preventing back-bending of the chain, the opposite ends of each member having recesses in which the adjoining pins are disposed, with the walls of the recesses spaced from the surfaces of the pins a greater distance than the walls of the holes in the links.

9. In a chain having links connected together by pins extending through alined holes in adjacent links, a row of members extending longitudinally of the chain and having plane side surfaces, means on said members preventing back-bending of the chain, and loose connections between said pins and members permitting elongation of the chain without disturbing said means.

10. In a chain having links connected together by pins extending through alined holes in adjacent links, a row of members extending longitudinally of the chain, with the members disposed end to end in said row, each member having a back edge of a length substantially equal to the center to center spacing of said pins.

11. In a chain having links connected together by pins extending through alined holes in adjacent links, a row of members extending longitudinally of the chain, with the members disposed end to end in said row, each member having a back edge of an average length substantially equal to the center to center spacing of said pins.

12. In a chain having links connected together by pins extending through alined holes in adjacent links, a row of members extending longitudinally of the chain, with the members disposed end to end in said row, and abutments on the ends of adjoining members in contact when the chain is straight, the ends of said members having recesses in which the adjoining pins are disposed.

13. In a chain having links connected together by pins extending through alined holes in adjacent links, a row of members extending longitudinally of the chain, with the members disposed end to end in said row, abutments on the ends of adjoining members in contact when the chain is straight, the ends of said members having recesses in which the adjoining pins are disposed, with the walls of the recesses spaced from the surfaces of the pins a greater distance than the walls of the holes in the links.

14. In a chain having links connected together by pins extending through alined holes in adjacent links, a row of members having plane side surfaces and extending longitudinally of the chain and disposed substantially entirely in front of the back surface of the chain in all positions of the chain, and means on said members preventing back-bending of the chain.

15. In a chain having successive pitches of links, with the links in one pitch overlapping those in adjoining pitches, pins extending through alined holes in said overlapping links, members in adjoining pitches having plane side surfaces and also having means thereon preventing back-bending of the chain, the backs of the links in a pitch being disposed in substantially a single surface, and the member in that pitch having a back edge disposed at least as far forwardly as said surface, in all positions of the chains.

16. In a chain having links connected together by pins extending through alined holes in adjacent links, a row of members extending longitudinally of the chain and disposed end to end in the row, the adjacent ends of the members being disposed on opposite sides of said pins and having cylindrical-surfaced recesses to receive said pins and surfaces receding from each other in front of the pins.

17. In a chain having links connected together by pins extending through alined holes in adjacent links, a row of members extending longitudinally of the chain and disposed end to end in the row, the adjacent ends of the members being disposed on opposite sides of said pins and having cylindrical-surfaced recesses to receive said pins and surfaces receding from each other in front of the pins, and abutments back of the pins in contact when the chain is straight.

18. In a chain having links connected together by pins extending through alined holes in adjacent links, guide plates mounted on said pins, and members supported by the pins independently of said links and guide plates and having means for preventing back-bending of the chain, said means being undisturbed by elongation of the chain.

19. In a chain having links connected together by pins extending through alined holes in adjacent links, members supported by the pins but acting independently of said links and pins and having means for preventing back-bending of the chain, said means being undisturbed by elongation of the chain.

20. In a chain having links connected together by pins extending through alined holes in adjacent links, members supported by the pins but acting independently of said links and pins and having recesses adapted to receive teeth of a sprocket and also having means for preventing back-bending of the chain, said means being undisturbed by elongation of the chain.

WARREN J. BELCHER.